United States Patent [19]
Kelly et al.

[11] Patent Number: 4,985,467
[45] Date of Patent: Jan. 15, 1991

[54] HIGHLY ABSORBENT POLYURETHANE FOAM

[75] Inventors: David J. Kelly, Chester, Pa.; Dai W. Kim, Chatham, N.J.

[73] Assignee: Scotfoam Corporation, Eddystone, Pa.

[21] Appl. No.: 336,954

[22] Filed: Apr. 12, 1989

[51] Int. Cl.$^5$ .............................................. C08G 18/14
[52] U.S. Cl. ..................................... 521/52; 521/84.1; 521/109.1; 521/137; 521/905
[58] Field of Search ............. 521/52, 137, 84.1, 109.1, 521/905

[56] References Cited

U.S. PATENT DOCUMENTS

| | | | |
|---|---|---|---|
| 3,021,290 | 2/1962 | Gmitter et al. | 521/109.1 |
| 3,171,820 | 3/1965 | Volz | 521/172 |
| 3,175,025 | 3/1965 | Green et al. | 521/52 |
| 4,359,558 | 11/1982 | Gould et al. | 521/905 |
| 4,394,930 | 7/1983 | Korpman | 521/149 |
| 4,521,544 | 6/1985 | Kennedy | 521/109.1 |
| 4,731,391 | 3/1988 | Garvey | 521/137 |

Primary Examiner—Maurice J. Welsh
Attorney, Agent, or Firm—Connolly and Hutz

[57] ABSTRACT

A highly hydrophilic polyurethane article, which is the skeletal network of a cellular polyurethane foam subjected to a reticulation process wherein the polyurethane contains up to 100 parts of a superabsorbent material per hundred parts of polyol used in preparing the polyurethane, is useful in absorbing and holding large amounts of aqueous liquids is prepared by:

(a) mixing a polyisocyanate, a polyol and a blowing agent with a finely divided superabsorbent material which is insoluble in a liquid which the material absorbs and which absorbs at least 15 times its weight of said liquid, (b) reacting the polyisocyanate, polyol and blowing agent under foaming conditions to produce a foam of polyurethane which cmprises a multitude of gas cells or bubbles within the polyurethane matrix, (c) curing said foam of polyurethane, forming a cellular structure with windows or membranes of solid polyurethanes present between gas cells or bubbles, (d) removing the windows or membranes by thermal reticulation thereby leaving the skeletal structure of the cured polyurethane; and said article is useful wherever high absorption and retention of large quantities of aqueous liquids is needed, including diapers, surgical sponges, and so forth.

16 Claims, No Drawings

HIGHLY ABSORBENT POLYURETHANE FOAM

The present invention is directed to an improvement in polyurethane foam whereby the absorption and holding of water and aqueous solutions is greatly increased over previously known polyurethane foam materials.

BACKGROUND OF THE INVENTION

Solid materials with a quantity of water and aqueous fluids have long found utility in numerous arts. Both natural and synthetic materials have been developed which will absorb various quantities of aqueous materials.

One of the earliest of such materials was obtained from the marine animal, the sponge. Natural sponges were used in ancient Greece and Rome to apply paint, as mops and by soldiers as substitutes for drinking vessels. Natural sponges absorb considerable amounts of aqueous fluids and, as such, are useful in medicine for absorbing blood and other body fluids, and in industry wherever absorbent material is needed.

However, natural sponges have today been largely replaced by synthetic "sponges". Advantages of synthetic sponges are their more constant supply and their being available in any size or shape desired. Synthetic sponges can be made from a variety of polymers including vinyls, viscose, cellulose, rubber, polyurethane and so forth. Many of the materials themselves are not inherently water absorbent per se and their water holding capacity is a function of the sponge-like physical structure or by use of some absorbing adjunct.

So-called sponge rubber may be made either from dry rubber or from latex. Blowing produces one type of sponge rubber from dry rubber. During vulcanization, the chemicals that have been added turn to gas and "blow" tiny bubbles of air in the rubber compound. When the rubber gels, or sets, in the mold, the bubbles are trapped in it. Blown sponge rubber may be either hard or soft.

Foam rubber is a type of sponge rubber made by whipping air into latex, much as a cook whips air into egg whites. Vulcanization takes place after the foam gels in a mold. Foam rubber has millions of tiny cells filled with air. Some types may be nine-tenths air and only one-tenth rubber. Foam rubber is used for upholstery and foam strips for surgical use. Thus both "sponge rubber" and "foam rubber" are closed cell foams wherein closed voids or cells provide reservoir spaces for liquids.

Polyurethane foams are prepared by reacting a polyisocyanate with a poly-hydroxy compound in the presence of a small amount of water as a "blowing agent". The water reacts with isocyanate groups producing carbon dioxide gas which forms the cells or trapped bubbles when the polyurethane sets.

There has long been interest in producing more highly absorbent materials particularly for use in such products as sanitary napkins, diapers, disposable dust cloths, etc. Many of the prior art materials used to form these products have been non-woven fabrics, papers, pulps, spongy urethane resins, natural sponges and the like. However, these materials exhibit relatively low water absorbency, thus failing to satisfy the need for a low volume, high water absorbent material. Substitutes for these materials such as cross-linked polyethylene oxides, cross-linked polyvinyl alcohols and hydrolyzed products of starch-polyacrylonitrile-grafted polymer have recently appeared on the market. While these products do show increased water absorbency, they also suffer from significant disadvantages in that their water absorbency is still not sufficiently high to justify the costs and the difficulties of production. In addition, some of these materials create disposal problems because they are not biologically degradable. Thus, in the prior art, various proposals to increase the water absorbency and holding capacity for synthetic foams have been advanced.

U.S. Pat. No. 4,104,435 relates to a synthetic sponge comprising a foamed resilient material with a network of fibrous material containing therein.

U.S. Pat. No. 4,717,738 discloses a polyurethane resin based on a hydroxyl containing polymer polyol and a process for making the same.

U.S. Pat. No. 4,725,629 discloses a super absorbent polyurethane foam based on an interconnecting polymer network of a cross-linked polyurethane and a cross-linked addition polymer containing a plurality of chain segments made up of functional groups containing repeating units which may be the same or different.

A biodegradable, high water absorbent polymer has been disclosed in U.S. Pat. No. 4,076,663. While the resins of this patent do show increased water absorbency, their use has been limited to mixing them with sanitary napkins, diapers and other such products wherein the resins are used in their particulate or powder form. Thus, this process fails to disclose the combination of this water absorbent resin with a means for using these polymers within a confined structure or for use with other polymers within a foamed structure, thus retaining the absorbency of the water absorbent material within the confines of a conventional foamed structure.

U.S. Pat. Nos. 4,454,268; 4,337,181 and 4,133,784 disclose various types of films which contain water absorbent polymers. While these patents disclose starch-based, water absorbent polymers prepared from a combination of starch and ethylene acrylic acid copolymers, they fail to disclose the particular type of water absorbent polymer disclosed herein or the mixture of a water absorbent polymer with a conventional polymer which is subsequently foamed to form a foam which exhibits high water absorbency while retaining the characteristics of the polymer which form the polymer foam.

U.S. Pat. No. 3,669,103 discloses water swellable, water insoluble polymeric sorbents for the absorption of aqueous fluids wherein said polymeric sorbents are lightly cross-linked polymers. This patent also discloses the use of a water insoluble polyurethane foam as a support for the polymeric absorbent.

U.S. Pat. No. 4,464,428, describes a closed cell foam of a cross-linked plastic material (such as polyolefin) having a plurality of internal canals which are filled with particulate material, fiber bundles and so forth.

U.S. Pat. No. 4,394,930, relates to an absorbent foam product by reacting under foaming conditions a solids, water insoluble, water-swellable polymer (such as a polyacrylate), a solid blowing agent and a liquid polyhydroxy compound.

U.S. Pat. No. 3,900,030 and U.S. Pat. No. 4,239,043 each describe a means for increasing the absorbency of polyurethane foam catamenial devices. The former suggests using a flexible open-celled foam in which a finely divided, water-swellable polymer is uniformly dispersed and the latter suggest improving foam absorbency by placing on the foam surface 5 to 35%, by weight of cellulose fibers.

Japanese published application Ser. No. 55-168,104 (1982) discloses that loss of water absorbing and water stopping properties of a polyurethane foam can be minimized if the closed-cell polyurethane foam contains both independent air bubbles as well as water-absorbing resin particles of a specific size range. Water absorbing resins are disclosed to include polymeric electrolyte prepared by grafting an acrylic acid type monomer onto starch, acrylate polymer or copolymer hydrolysates, cross-linked sodium polyacrylate and so forth.

U.S. Pat. No. 4,731,391, discloses a method of preparing a superabsorbent polyurethane foam wherein polyurethane foam precursors are mixed and reacted under foaming and free radical conditions with an ethylenically unsaturated compound such as an acrylate, methacrylate or acryamide.

Japanese published application Ser. No. 57-92,032 (1982) disclosed a polyurethane foam that contains a water absorbent polymer wherein the percentage of the air bubble formation is in the range of 1 to 60 percent, wherein the diameter of the cells is in the range of 200 to 400 microns and wherein the size of the water absorbent resin is in the range from about 200 to 400 microns.

Thus, the art has long sought a synthetic material which will absorb and hold large quantities of water. It is therefore one object of the present invention to provide a synthetic structure which will absorb and hold large quantities of aqueous liquids. It is another object of this invention to prepare polymer foams which are highly water absorbent and which have the ability to retain and hold a high water content.

It is a further object of this invention to prepare foamed polyurethane polymers containing highly water absorbent resin.

It is still a further object of this invention to provide water absorbent foams which can be useful for the absorbence of fluids while retaining their basic shape.

These and other objects, as well as the scope, nature, and utilization of this invention, will be apparent from the following description.

BRIEF DESCRIPTION OF THE INVENTION

It has now been surprisingly discovered that a synthetic polymer skeletal matrix can absorb and hold unexpectably large quantities of aqueous liquids notwithstanding its completely open physical structure. The skeletal matrix according to this invention is prepared by mixing a hydrocolloid with polymer precursors, producing a polymer foam from that mixture and then thermally reticulating the foam to produce the skeletal matrix.

The foam produced by this process can be highly useful in those areas where high water absorbence is critical, such as for use with diapers, sanitary napkins and the like, packaging material for products which must avoid exposure to water and other areas where high water absorbence of a material in a foam structure is important.

DETAILED DESCRIPTION

Any type of polymer which can be foamed and subsequently reticulated can be used as the polymer for producing the water absorbent polymer foam of this invention. For example, cellular polystyrene, polyvinyl chloride, copolymers of styrene N-acrylonitrile, and polyethylene foams can be manufactured by a conventional physical stabilization process. Cellular polystyrene, cellulose acetate, polyolefins and polyvinyl chloride foams can be manufactured by any conventional decompression expansion process. However, the most versatile method is a chemical stabilization process for the production of foams such as polyurethane, polyisocyanates, polyphenols, epoxy resins and silicon resins. Polyurethane is the preferred polymer to be used in preparation of the water absorbent polymer foam of this invention.

Thus, the present invention involves first producing a polymer foam which contains in the polymer a superabsorbent material and then reticulating that foam. The following disclosure will be expressed in terms of a polyurethane foam but it should be understood that any suitable polymer can be used in place of polyurethane.

The polyurethane foam (or other polymeric foam) which is subjected to thermal reticulation in this invention can be prepared by known methods of polymer foam production. To produce a foam suitable as a reticulation precursor for the present invention, a mixture comprising a polyurethane foam reaction mixture and a superabsorbent material dispersed therein is prepared. The polyurethane foam reaction mixture is a conventional mixture used to produce known polyurethane foams and comprises a polyisocyanate, a polyhydroxy compound (polyol), a blowing agent and other conventional additives such as catalysts, surfactants, and so forth, all of which are well known to those of ordinary skill in the polymer foam art.

When the polyisocyanate and polyol react to form polyurethane, a gas or vapor is generated in situ by the blowing agent while the reaction mixture remains in the fluid or plastic state. The generation of this gas results in the formation of bubbles, approximately spherical in shape, in the plastic material. As the bubbles expand, cells are formed and the resulting structure when cured comprises a foamed polyurethane with a cellular structure with interconnecting cell membranes. A common blowing agent is water which reacts with excess isocyanate groups to form, in situ, carbon dioxide gas.

Additional materials may also be added to the foamable reaction mixture, such as surfactants, fillers or nonwoven fibers to further enhance foam properties. For example, in one embodiment, surface absorption can be assisted by adding surfactants such as Pluronic-type surfactants prior to the foaming operation. These products will enhance the capability of the foams in their absorbence by increasing the rate at which the water is absorbed.

Suitable isocyanate reactants include, but are not limited to aromatic polyisocyanates having a ratio of isocyanate groups to aromatic rings of about 2:1 to about 1:1. Examples are toluene diisocyanate (TDI), phenylene diisocyanate, xylene diisocyanate napthylene diisocyanate and diphenyl-4, 4-diisocyanate.

Polyols are generally categorized as polyether polyols or polyester polyols. Polyether polyols are conventionally oxides, such as ethylene oxide or propylene oxide, polymerized onto an active hydrogen compound such as ethylene glycol, propylene glycol, glycerol and so forth. Polyester polyols are conventionally polycondensation products of polyhydric acids, such as adipic acid, maleric acid or phathalic acid, with polyhydroxy compounds, such as ethylene glycol, propylene glycol, glycerol and so forth.

In addition to the conventional foam-forming formulation of polyisocyanate, polyol and blowing agent, the polyurethane foam used to prepare the skeletal structure of the present invention must have incorporated therein a solid superabsorbent material. A suitable superabsorbent material is one which remains insoluble in the liquid it absorbs and will absorb at least 15 times its weight of the liquid. Both natural and synthetic superabsorbent materials are known. Natural materials include guar gum, other natural gums, starches, and so forth. Synthetic superabsorbents include chemically modified cellulose such as carboxymethyl cellulose, and acrylic-type polymers. Examples of acrylic-type superabsorbent materials are starch grafted sodium polyacrylate and sodium polyacrylate.

The water absorbent polymers are solid, water insoluble, water swellable polymers which are capable of absorbing many times their own weight of water or aqueous solutions. Such materials include polymers of water soluble acrylic or vinyl monomers which are slightly cross-linked with a polyfunctional reactant. Such cross-linked polymers include polyvinylpyrrolidone, sulfonated polystyrene, polysulfoethyl acrylate, poly(2-hydroxyethylacrylate) polyacrylamide, polyacrylic acid, partial and complete alkali metal salts of polyacrylic acid, and the like. Also included are starch modified polyacrylic acids and hydrolyzed plyacrylonitrile and their alkali metal salts.

Useful water absorbing polymers can be made by polymerizing acrylic acid and starch in an aqueous medium using a polyfunctional monomer, e.g., N,N-alkylene-bis-acrylamide, as the cross-linking agent. This process is described in U.S. Pat. No. 4,076,663. Water absorbing polymers can also be made as described in U.S. 4,340,706 by the inverse polymerization of acrylic acid followed by the cross-linking with a polyfunctional component, e.g., epichlorohydrin. Other water absorbing polymers and processes for their manufacture are disclosed in U.S. Pat. Nos. 4,654,039; 3,669,103 and 3,670,731. All of the aforesaid patents are hereby incorporated by reference.

The water absorbing polymers particularly useful in this invention are those described in U.S. Pat. No. 4,076,663. These water absorbing polymers have a particle size of from 0.5 micron to about 450 microns and are capable of absorbing at least about 15 times their weight of aqueous fluid. In a preferred embodiment superior absorption capabilities exist where the water absorbing polymer particles are less than about 30 microns in size. These particles show absorbence capability in excess of 65 times their weight.

These water absorbing polymer particles swell when they absorb aqueous fluid. The particles maintain the approximate shapes and geometry they had before contact with the fluid but the dimensions thereof are greatly enlarged.

From about 1 to 100 parts of superabsorbent per hundred parts of polyol foam forming material can be used. However, a preferred amount of superabsorbent material is 5 to 75 parts per hundred parts polyol; 10 to 50 parts per hundred is more preferred and about 25 to 50 parts per hundred parts polyurethane is most preferred.

Polyurethane foam containing the superabsorbent material is prepared by conventional methods for urethane foam production. The superabsorbent material in finely divided form is uniformly dispersed in a conventional foam-forming mixture of polyisocyanate, polyol and blowing agent. Then the mixture is reacted and the foam is formed. U.S. Pat. No. 4,731,391 describes a method for preparing a polyurethane foam having superabsorbent material incorporated in the polyurethane.

To obtain the skeletal structure of the present invention, the polyurethane foam containing superabsorbent material is subjected to thermal reticulation whereby the windows or membranes are removed from individual cells or bubbles which make up the foam structure thereby leaving an open cell or skeletal structure. Reticulation results in a foam having in excess of 80% open cells, preferably at least 95% open cells and most preferably at least 99% open cells. Thermal reticulation of polyurethane foam is a known procedure to those skilled in the art. See, for example, U.S. Pat. No. 3,171,820 and U.S. Pat. No. 3,175,025. Fundamentally, reticulation is achieved by providing a combustible mixture of an oxidizer material and an oxidizable material within the cells of a polyurethane foam and then igniting the combustible mixture whereupon the cell windows or membranes are destroyed.

Thus, the skeletal structure of the present invention is completely open. With such an open structure it is quite surprising that the structure of this invention will more rapidly absorb large amounts of liquid (such as water, blood, urine and so forth) than a corresponding non-reticulated cellular polyurethane foam.

The following examples merely illustrate the present invention without imposing limitations thereon.

EXAMPLES

A conventional polyurethane foam-forming formulation of toluene diisocyanate and a polyether polyol was modified by adding various indicated amounts of particulate superabsorbent material starch grafted sodium polyacrylate (SGP). Specifically the SGP is a graft copolymer of about 91 percent acrylic acid and 9 percent oxidized starch cross-linked with 0.1 percent N,N'-methylene-bis-acrylamide made by the process described in U.S. Pat. No. 4,076,663 with a particle size ranging from about 30 to 140 microns.

Foams were made from each formulation and water holding capacity, on both non-reticulated and reticulated foams, are listed below. To measure water holding capacity, a foam test sample 5×3×¼inches was weighed, immersed in water for 1 hour, removed from water and let drain on a screen for 3 minutes. The sample is then again weighed and the percent water pick-up is calculated.

| Example | SGP[1] | Water Holding Capacity[2] | |
|---|---|---|---|
| | | Non-Reticulated | Reticulated |
| CONTROL | 0 | 19.1 | 17.3 |
| 1 | 5 | 13.7 | 18.5 |
| 2 | 10 | 16.1 | 25.4 |
| 3 | 15 | 16.1 | 29.1 |
| 4 | 20 | 18.1 | 29.9 |
| 5 | 25 | 20.8 | 36.7 |
| 6 | 50 | 19.9 | 30.3 |

[1]Parts of starch grafted sodium polyacrylate (SGP) per 100 parts polyol.
[2]Water Holding capacity in terms of grams water absorbed per gram of foam.

Another test was run by modifying a conventional toluene diisocyanate/polyether polyol formulation with four different superabsorbent materials each in an amount of 50 parts per hundred parts polyurethane.

|         |                          | Water Holding Capacity |            |
|---------|--------------------------|------------------------|------------|
| Example | Superabsorbent           | Non-Reticulated        | Reticulated |
| CONTROL | NONE                     | 19.1                   | 17.3       |
| 8       | SGP                      | 19.1                   | 30.3       |
| 9       | Na polyacrylate          | 20.6                   | 38.6       |
| 10      | Na carboxymethylcellulose| 24.4                   | 28.5       |
| 11      | guar gum                 | 15.6                   | 19.2       |

To determine if water holding capacity increases with higher levels of superabsorbent material over 25 parts per hundred parts polyurethane, foams were prepared with six levels of SGP superabsorbent material from 25 to 50 parts per hundred and the resulting data is shown below:

|         |     | Water Holding Capacity |            |
|---------|-----|------------------------|------------|
| Example | SGP | Non-Reticulated        | Reticulated |
| 12      | 25  | 20.8                   | 36.9       |
| 13      | 30  | 19.8                   | 33.0       |
| 14      | 35  | 19.3                   | 33.0       |
| 15      | 40  | 20.5                   | 34.5       |
| 16      | 45  | 19.6                   | 34.8       |
| 17      | 50  | 19.9                   | 31.7       |

Thus, Examples 12–17 show that the water holding capacity does not increase with an increase in SGP content from 25 to 50 parts per hundred and remains substantially constant.

What is claimed is:

1. A highly hydrophilic polyurethane article which is the skeletal network of a cellular polyurethane foam subjected to reticulation wherein the polyurethane contains about 1 to 100 parts of a superabsorbent material per hundred parts of polyol used in preparing the polyurethane.

2. The article according to claim 1 wherein the polyurethane contains 5 to 75 parts of superabsorbent material per hundred parts of polyol.

3. The article according to claim 1 wherein the polyurethane contains 10 to 50 parts of superabsorbent material per hundred parts of polyol.

4. The article according to claim 1 wherein the polyurethane contains 25 to 50 parts of superabsorbent material per hundred parts of polyol.

5. The article according to claim 1 wherein the superabsorbent material is a natural gum.

6. The article according to claim 1 wherein the superabsorbent material is a chemically modified cellulose or an acrylic polymer.

7. The article according to claim 6 wherein the superabsorbent material is sodium polyacrylate or starch-grafted sodium polyacrylate.

8. A process for producing a highly hydrophilic article comprises:
   (a) mixing a polyisocyanate, a polyol and a blowing agent with a finely divided superabsorbent material which is insoluble in a liquid which the material absorbs and which absorbs at least 15 times its weight of said liquid,
   (b) reacting the polyisocyanate, polyol and blowing agent under foaming conditions to produce a foam of polyurethane which comprises a multitude of gas cells or bubbles within the polyurethane matrix,
   (c) curing said foam of polyurethane, forming a cellular structure with windows or membranes of solid polyurethane present between gas cells or bubbles, then
   (d) removing the windows or membranes by thermal reticulation thereby leaving the skeletal structure of the cured polyurethane.

9. A process according to claim 8 wherein the blowing agent in step a) is an aqueous blowing agent.

10. A process according to claim 8 wherein the amount of superabsorbent material is from about 1 to 100 parts per hundred parts of polyol.

11. A process according to claim 8 wherein the amount of superabsorbent material is 5 to 75 parts per hundred parts of polyol.

12. A process according to claim 8 wherein the amount of superabsorbent material is 10 to 50 parts per hundred parts of polyol.

13. A process according to claim 8 wherein the amount of superabsorbent material is 25 to 50 parts per hundred parts of polyol.

14. A process according to claim 8 wherein the superabsorbent material is a natural gum.

15. A process according to claim 8 wherein the superabsorbent material is a chemically modified cellulose or an acrylic polymer.

16. A process according to claim 15 wherein the superabsorbent material is sodium polyacrylate or starch-grafted sodium polyacrylate.

* * * * *